(12) United States Patent
Kakumitsu

(10) Patent No.: US 7,598,990 B2
(45) Date of Patent: Oct. 6, 2009

(54) IMAGE SIGNAL PROCESSING SYSTEM AND ELECTRONIC IMAGING DEVICE

(75) Inventor: Kenta Kakumitsu, Saitama (JP)

(73) Assignee: Fujifilm Corporation, Tokyo (JP)

( * ) Notice: Subject to any disclaimer, the term of this patent is extended or adjusted under 35 U.S.C. 154(b) by 806 days.

(21) Appl. No.: 11/080,466

(22) Filed: Mar. 16, 2005

(65) Prior Publication Data
US 2005/0206966 A1 Sep. 22, 2005

(30) Foreign Application Priority Data
Mar. 19, 2004 (JP) ............... 2004-080580

(51) Int. Cl.
H04N 5/217 (2006.01)
(52) U.S. Cl. .................... 348/241
(58) Field of Classification Search ........... 348/207.99, 348/222.1, 251, 241
See application file for complete search history.

(56) References Cited

U.S. PATENT DOCUMENTS

2004/0208395 A1* 10/2004 Nomura ............ 382/275
2005/0243190 A1* 11/2005 Ogikubo ............ 348/231.99

FOREIGN PATENT DOCUMENTS

| JP | 2001-167263 | A | 6/2001 |
| JP | 2001167263 | * | 6/2001 |
| JP | 2001-339736 | A | 12/2001 |
| JP | 2003-018447 | A | 1/2003 |
| JP | 2004-48562 | A | 2/2004 |

\* cited by examiner

Primary Examiner—Tuan V Ho
(74) Attorney, Agent, or Firm—Birch, Stewart, Kolasch & Birch, LLP

(57) ABSTRACT

An image signal processing system and an electronic imaging device are provided in which a shading correcting circuit carries out shading correction by multiplying image data by a gain which is proportional to a distance from a center of an image; a noise reduction filter carries out noise reduction processing by using a value which varies inversely proportionately to the gain; and a contour correction processing circuit carries out substantially uniform contour correction at all regions of the image, independently of the shading correction and the noise reduction processing.

8 Claims, 6 Drawing Sheets

FIG.6A

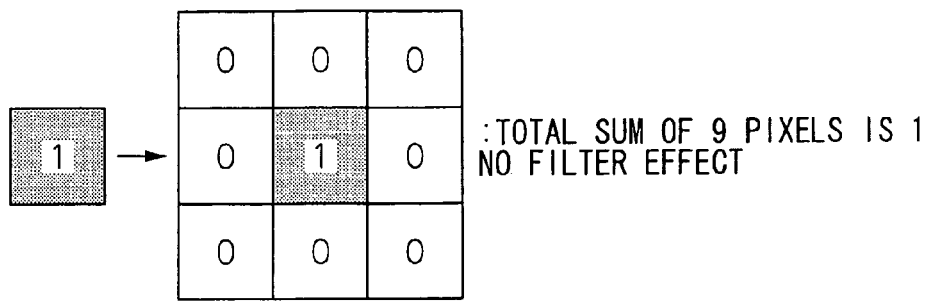

: TOTAL SUM OF 9 PIXELS IS 1
NO FILTER EFFECT

FIG.6B

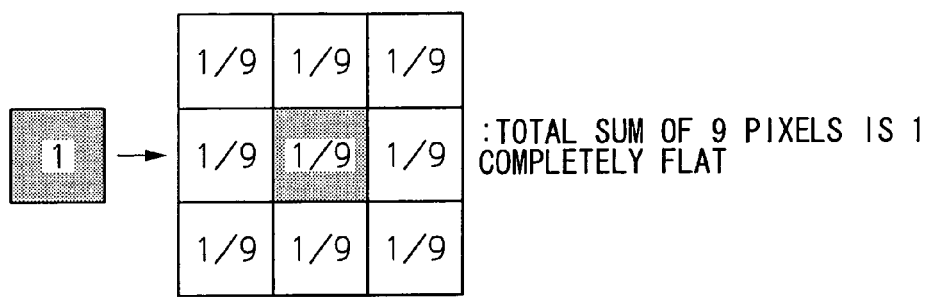

: TOTAL SUM OF 9 PIXELS IS 1
COMPLETELY FLAT

FIG.6C

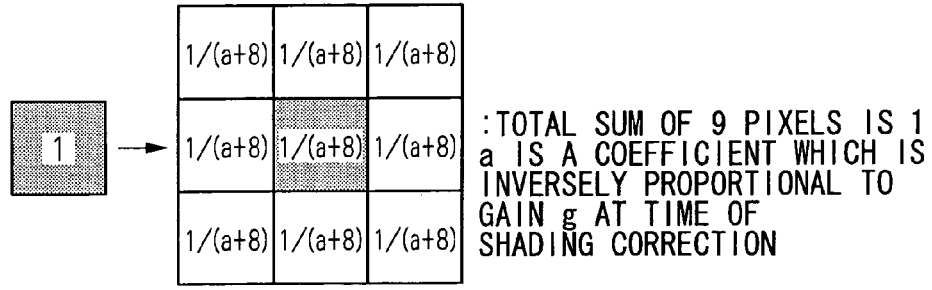

: TOTAL SUM OF 9 PIXELS IS 1
a IS A COEFFICIENT WHICH IS
INVERSELY PROPORTIONAL TO
GAIN g AT TIME OF
SHADING CORRECTION

FIG.6D
EXAMPLE: WHEN a IS 2
(PERIPHERAL PORTION)

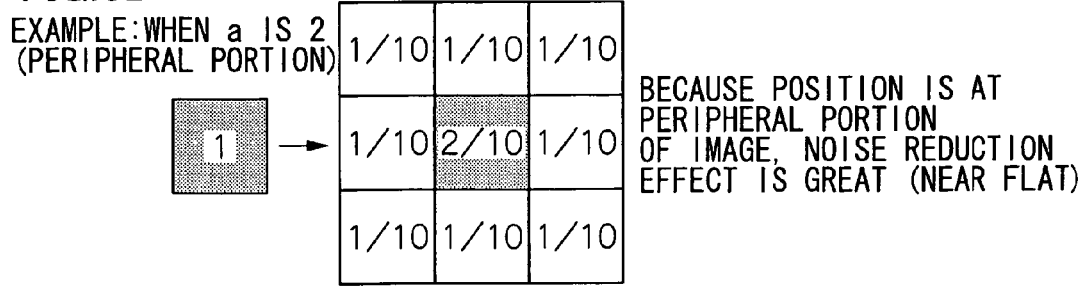

BECAUSE POSITION IS AT
PERIPHERAL PORTION
OF IMAGE, NOISE REDUCTION
EFFECT IS GREAT (NEAR FLAT)

FIG.6E
EXAMPLE: WHEN a IS 7
(NEAR CENTER)

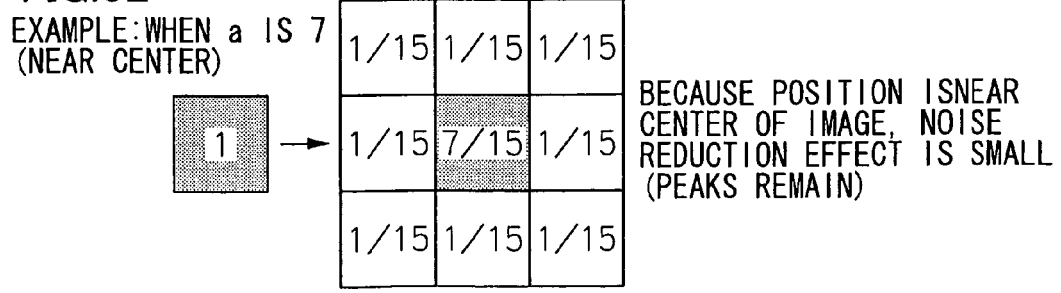

BECAUSE POSITION IS NEAR
CENTER OF IMAGE, NOISE
REDUCTION EFFECT IS SMALL
(PEAKS REMAIN)

IMAGE SIGNAL PROCESSING SYSTEM AND ELECTRONIC IMAGING DEVICE

CROSS-REFERENCE TO RELATED APPLICATION

This application claims priority under 35 USC 119 from Japanese Patent Application No. 2004-80580, the disclosure of which is incorporated by reference herein.

BACKGROUND OF THE INVENTION

1. Field of the Invention

The present invention relates to an image signal processing system and an electronic imaging device.

2. Description of the Related Art

The phenomenon as shown in FIG. 4 in which the light amount decreases in stages and substantially in concentric circles from the optical center of an image (the optical axis of the image-pickup optical system) toward the peripheral portion of the image surface is called shading (peripheral extinction). This is problematic in wide images in particular because the ability to delineate the image at the peripheral portion deteriorates.

In electronic imaging devices such as digital cameras, digital video cameras, and the like, by raising the gain of the output signal of an image pick-up element (CCD) gradually and in concentric circles from the optical center of the image toward the periphery, the peripheral extinction can be cancelled out, and the image can be corrected so as to become substantially the same brightness on the whole.

However, conventionally, because the gain of the peripheral portion is raised as compared with the central portion of the image surface, the gain of the noise at the peripheral portion of the image is also raised, and the S/N (signal-to-noise ratio) deteriorates. If the S/N at the peripheral portion of the image surface deteriorates, as a result, a new problems arises in that the image quality of the image on the whole is reduced.

In electronic imaging devices such as digital cameras and the like, usually, contour correction is carried out and the contour is enhanced, in order to show the image distinctly. However, with both of the above-described shading correction and contour correction, noise is generated in the actual image. Further, if strong shading correction is carried out, the amount of noise which is generated increases in proportion to the amount of correction.

There have been proposed shading correction devices in which noise at the peripheral portion of the image is made less conspicuous by, while carrying out the shading correction, suppressing the amount of contour correction at the peripheral portion of the image where strong shading correction is needed (see, for example, Japanese Patent Application Laid-Open (JP-A) Nos. 2001-339736 and 2001-167263).

However, the noise arising from shading correction and the noise arising from contour correction are intrinsically in different dimensions, and it is preferable that they respectively be processed appropriately. In particular, in the above-described method of suppressing the amount of contour correction in order to reduce noise at the peripheral portion of the image, the sharpness of the peripheral portion of the image decreases, which, as a result, leads to a reduction in image quality.

SUMMARY OF THE INVENTION

In view of the aforementioned, the present invention provides an image signal processing system and an electronic imaging device which, while carrying out shading correction, carry out uniform contour correction over the entire image region.

In accordance with a first aspect of the present invention, there is provided an image signal processing system comprising: a lens shading correcting circuit; and a noise reduction filter, wherein parameters used at the noise reduction filter are varied dynamically in accordance with an amount of correction at the lens shading correcting circuit.

In accordance with a second aspect of the present invention, there is provided an electronic imaging device comprising: an optical unit including a lens which focuses an image of a subject; an image pick-up section including an image pick-up element, which is disposed at a rear of an optical axis of a lens system and carries out image pick-up via the optical unit, and an analog/digital converter converting an analog image signal from the image pick-up element into a digital image signal; a lens shading correcting circuit; a noise reduction filter; and a contour correction processing circuit, wherein the lens shading correcting circuit carries out shading correction by multiplying image data from the analog/digital converter by a gain which is proportional to a distance from a center of the lens, the noise reduction filter carries out noise reduction processing by using a value which varies inversely proportionately to the gain, and the contour correction processing circuit carries out substantially uniform contour correction at all regions of the image, independently of the shading correction and the noise reduction processing.

As described above, in accordance with the present invention, there is realized an image signal processing system and an electronic imaging device which, while carrying out shading correction, carry out uniform contour correction over the entire image region.

BRIEF DESCRIPTION OF THE DRAWINGS

FIGS. 6A through 6E are drawings showing effects of a noise reduction filter in accordance with the present invention.

DETAILED DESCRIPTION OF THE INVENTION

Figure 1:
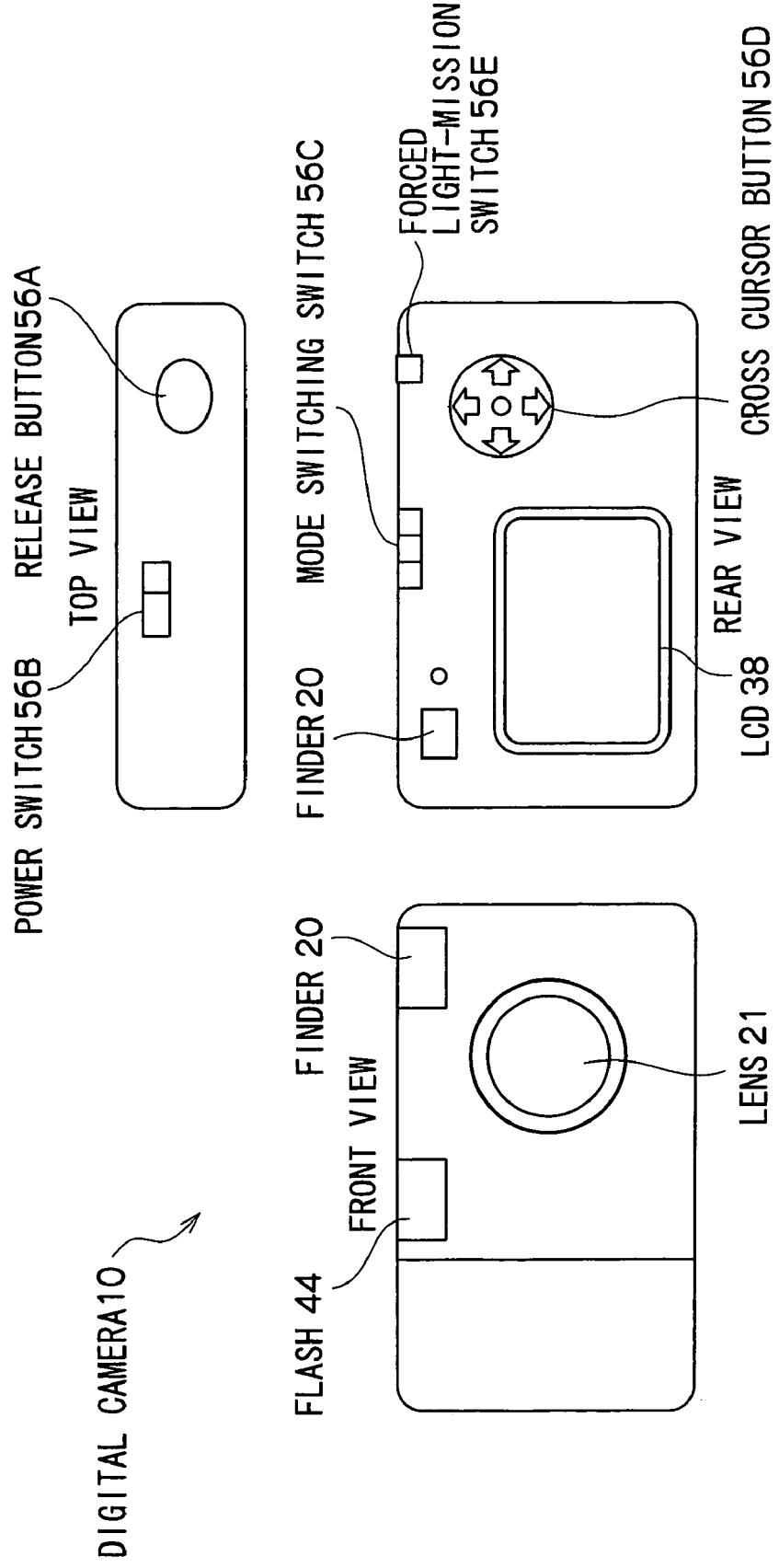
FIG. 1 is a drawing showing the exterior of a digital camera in accordance with an embodiment of the present invention.

An embodiment of the present invention will be described in detail hereinafter with reference to the drawings. First, the external structure of a digital camera 10 relating to the present embodiment will be described with reference to FIG. 1.

A lens 21 for focusing an image of a subject, a flash 44 emitting light which illuminates the subject as needed at the time of photographing, and a finder 20 used for determining the composition of the subject to be photographed, are provided at the front side of the digital camera 10. A release button ("shutter") 56A which is and operated by pressing at the time of executing the photographing, and a power switch 56B are provided at the top side of the digital camera 10.

The eyepiece portion of the finder 20, a liquid crystal display (hereinafter, referred to as "LCD") 38, and a mode switching switch 56C are provided at the rear side of the digital camera 10. The LCD 38 is for displaying the image of the subject which is photographed, menu screens, and the like. The mode switching switch 56C is slid at the time of setting the mode to either a photographing mode, which is the mode for carrying out photographing, or a playback mode, which is a mode for playing back the image of the subject on the LCD 38.

Also provided at the rear side of the digital camera 10 are a cross cursor button 56D, and a forced light-emission switch 56E which is pressed and operated at the time of setting a forced light-emission mode which is a mode for forcibly making the flash 44 emit light at the time of photographing.

The cross cursor button 56D is structured so as to include a total of five keys, which are four arrow keys showing the directions of movement in the four directions of top, bottom, left, right in the display region of the LCD 38, and a select key positioned at the center of these four arrow keys.

Figure 2:
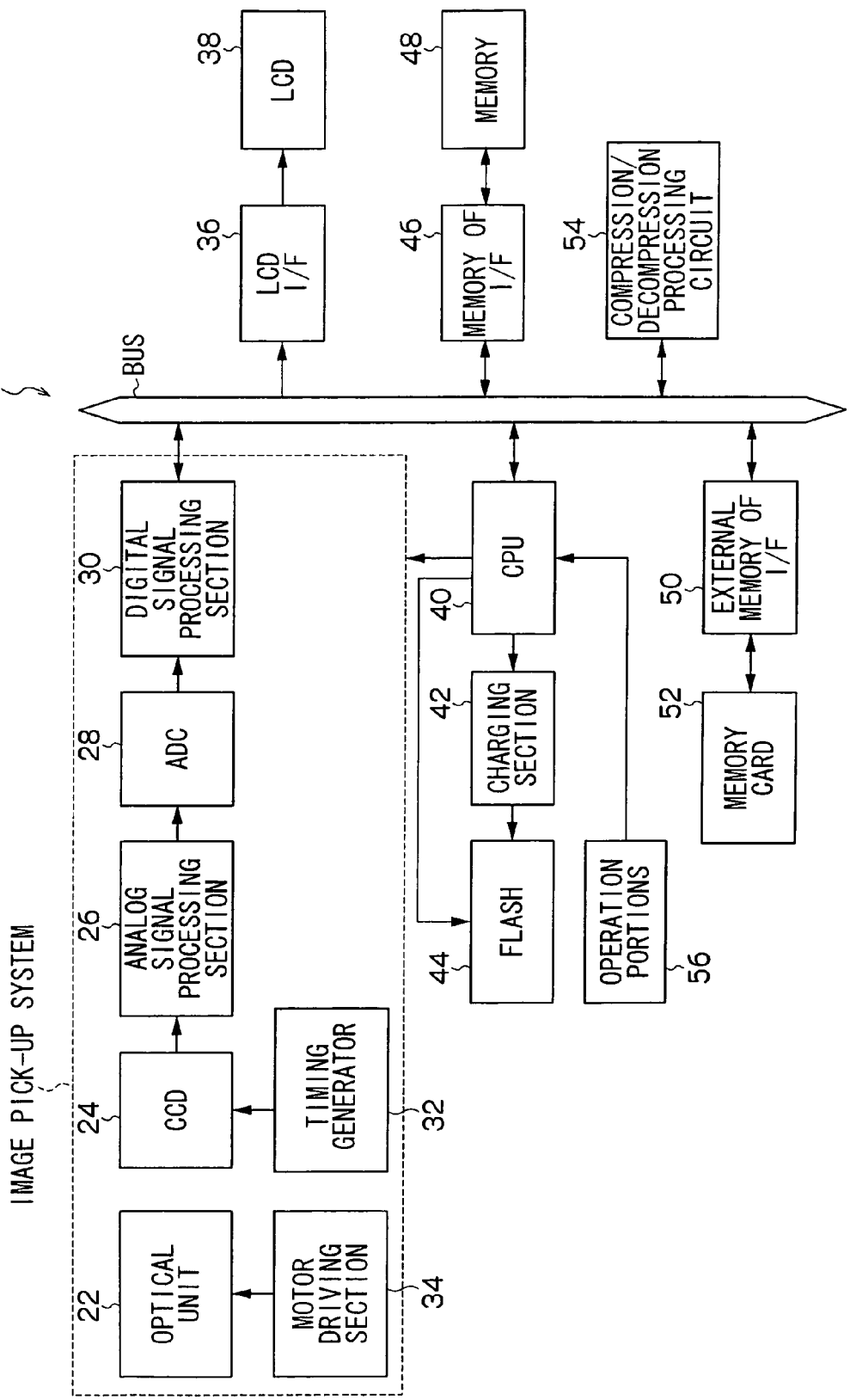
FIG. 2 is a block diagram showing the structure of the digital camera shown in FIG. 1.

The structure of the electrical system of the digital camera 10 relating to the present embodiment will next be described with reference to FIG. 2.

The digital camera 10 includes an optical unit 22 which includes the aforementioned lens 21, a charge coupled device (hereinafter, referred to as "CCD") 24 disposed at the rear of the optical axis of the lens 21, and an analog signal processing section 26 carrying out various types of analog signal processings with respect to inputted analog signals.

The digital camera 10 also includes an analog/digital converter (hereinafter, referred to as "ADC") 28 converting an inputted analog signal into digital data, and a digital signal processing section 30 carrying out various types of digital signal processings on inputted digital data.

A line buffer of a predetermined capacity is incorporated in the digital signal processing section 30. The digital signal processing section 30 also performs control for directly storing of inputted digital data into a predetermined region of a memory 48 which will be described later.

The output end of the CCD 24 is connected to the input end of the analog signal processing section 26. The output end of the analog signal processing section 26 is connected to the input end of the ADC 28. The output end of the ADC 28 is connected to the input end of the digital signal processing section 30. Accordingly, the analog signal, which is outputted from the CCD 24 and expresses the image of the subject, is subjected to predetermined analog signal processings by the analog signal processing section 26, is converted into a digital image signal by the ADC 28, and thereafter, the digital image signal is inputted to the digital signal processing section 30.

The digital camera 10 also includes an LCD interface 36 which generates signals for displaying on the LCD 38 the image of the subject, menu screens or the like, and supplies these signals to the LCD 38; a CPU (central processing unit) 40 governing operation of the digital camera 10 overall; the memory 48 storing the digital image data obtained by photographing, and the like; and a memory interface 46 controlling access to the memory 48.

The digital camera 10 also includes an external memory interface 50 and a compression/decompression processing circuit 54. The external memory interface 50 enables a portable memory card 52 to be accessed at the digital camera 10. The compression/decompression processing circuit 54 carries out compression processing and decompression processing with respect to digital image data.

In the digital camera 10 of the present embodiment, a VRAM (Video RAM) is used as the memory 48, and a Smart Media (Registered Trademark) is used as the memory card 52.

The digital signal processing section 30, the LCD interface 36, the CPU 40, the memory interface 46, the external memory interface 50, and the compression/decompression processing circuit 54 are connected to one another via a system bus BUS. Accordingly, the CPU 40 can carry out control of the operations of the digital signal processing section 30 and the compression/decompression processing circuit 54, display of various types of information on the LCD 38 via the LCD interface 36, and access to the memory 48 and the memory card 52 via the memory interface 46 and the external memory interface 50.

A timing generator 32, which mainly generates a timing signal for driving the CCD 24 and supplies the timing signal to the CCD 24, is provided at the digital camera 10. The driving of the CCD 24 is controlled by the CPU 40 via the timing generator 32.

A motor driving section 34 is provided at the digital camera 10. Driving of a focal point adjusting motor, a zoom motor, and an aperture driving motor, which are provided at the optical unit 22 and none of which is illustrated, is controlled by the CPU 40 via the motor driving section 34.

Namely, the lens 21 in the present embodiment has plural lenses, and is structured as a zoom lens which can change the focal length (change the magnification), and has a lens driving mechanism (not illustrated). The aforementioned focal point adjusting motor, zoom motor, and aperture driving motor are included in the lens driving mechanism. These motors are respectively driven by driving signals supplied from the motor driving section 34 in accordance with control of the CPU 40.

The above-described release button 56A, power switch 56B, motor switching switch 56C, cross cursor button 56D and forced light-emission switch 56E (collectively referred to as "operation portions 56" in FIG. 2) are connected to the CPU 40. The CPU 40 can at all times know of the states of operation of these operation portions 56.

A charging section 42 is provided at the digital camera 10. The charging section 42 is interposed between the flash 44 and the CPU 40, and, in accordance with control of the CPU 40, charges electricity for causing the flash 44 to emit light. The flash 44 is also connected to the CPU 40, and the emission of light by the flash 44 is controlled by the CPU 40.

Next, the overall operation of the digital camera 10 of the present embodiment at the time of photographing will be briefly described.

First, the CCD 24 carries out image pick-up via the optical unit 22, and successively outputs, to the analog signal processing section 26, analog signals of R (red), G (green), and B (blue) which express the image of the subject. The analog signal processing section 26 carries out analog signal processings, such as correlated double sampling and the like, on the analog signals inputted from the CCD 24, and thereafter, successively outputs the processed signals to the ADC 28.

The ADC 28 converts the R, G, B analog signals inputted from the analog signal processing section 26 into R, G, B signals (digital image data) of 12 bits each, and successively outputs the signals to the digital signal processing section 30. The digital signal processing section 30 accumulates, in the line buffer incorporated therein, the digital image data successively inputted from the ADC 28, and directly stores the data in a predetermined region of the memory 48 once.

The digital image data which is stored in the predetermined region of the memory 48 is, in accordance with control by the CPU 40, read-out by the digital signal processing section 30. White balance adjustment is carried out by applying a digital gain corresponding to a predetermined physical amount, and gamma processing and sharpness processing are carried out, such that 8-bit digital image data is generated.

Then, the digital signal processing section 30 carries out YC signal processing on the generated 8-bit digital image data, and generates a luminance signal Y and chroma signals Cr, Cb (hereinafter called "YC signals"), and stores the YC signals in a region of the memory 48 which is different than the aforementioned predetermined region.

The LCD 38 displays the dynamic image (through image) obtained by the continuous image pick-up by the CCD 24, and is structured so as to be able to be used as a finder. When the LCD 38 is used as a finder, the generated YC signals are successively outputted to the LCD 38 via the LCD interface 36. The through image is thereby displayed on the LCD 38.

Here, when the user pushes the release button 56A halfway, as described above, the AE function works and the exposure state is set, and thereafter, the AF function works and the focus control is performed. Thereafter, if the user continues to push the release button 56A to its fully depressed state, the YC signals stored in the memory 48 at that point in time are compressed by the compression/decompression processing circuit 54 in a predetermined compression format (JPEG in the present embodiment), and thereafter, are recorded in the memory card 52 via the external memory interface 50.

Next, the structures of shading correction, noise reduction, and contour correction of the digital camera 10 according to the present embodiment will be described.

Figure 3:
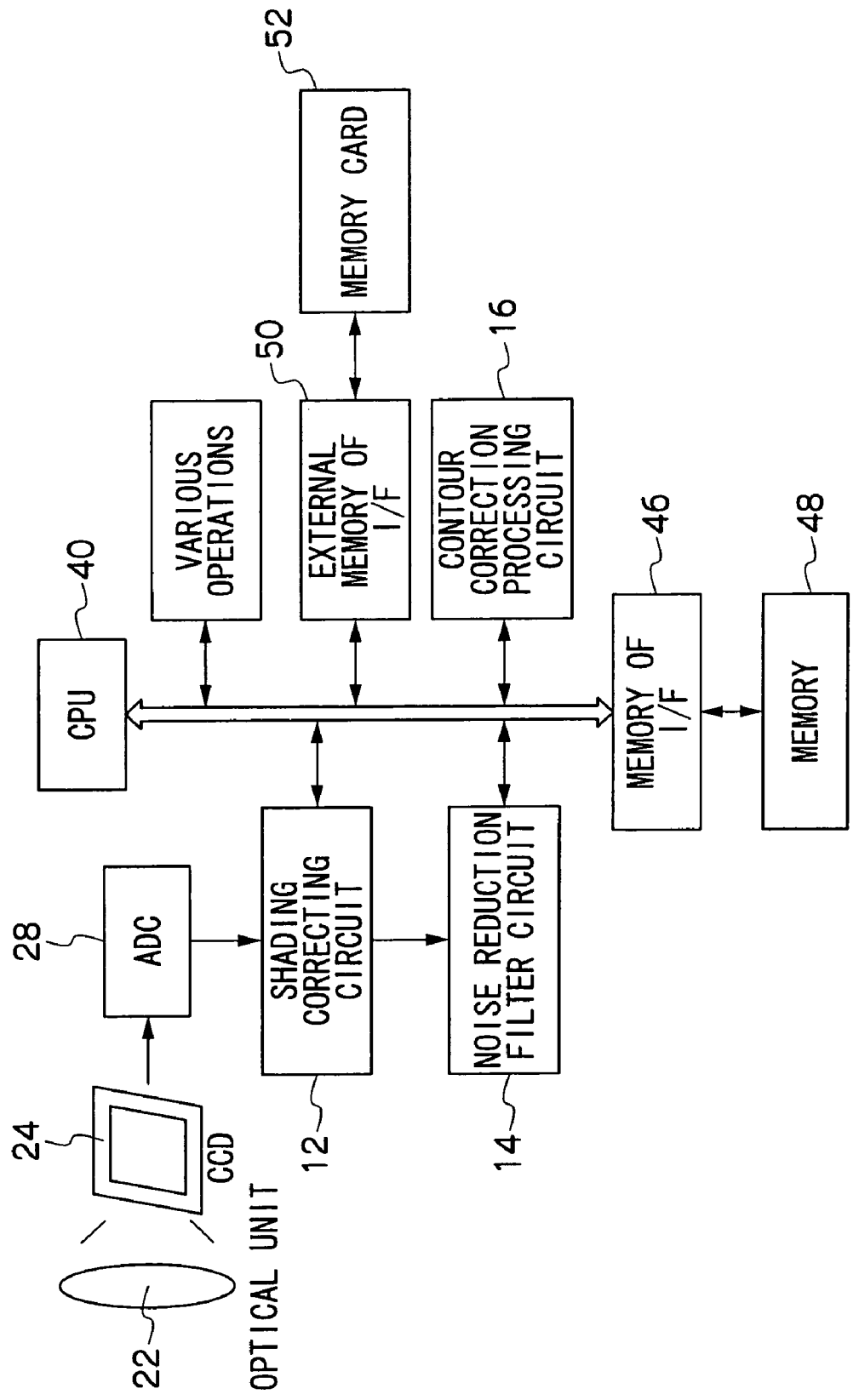
FIG. 3 is another block diagram showing the structure of the digital camera shown in FIG. 1.

As shown in FIG. 3, at a shading correcting circuit 12, the digital camera 10 carries out shading correction processing, which will be described later, with respect to the image data (raw data: RGB) transferred from the ADC 28. The image data, whose peripheral extinction is corrected thereby, is subjected to noise removal, which will be described later, at a noise reduction filter circuit 14. The parameters used at the noise reduction filter circuit 14 at this time are varied inversely proportionally to gain g used in the shading correction at the shading correcting circuit 12.

Figure 4:
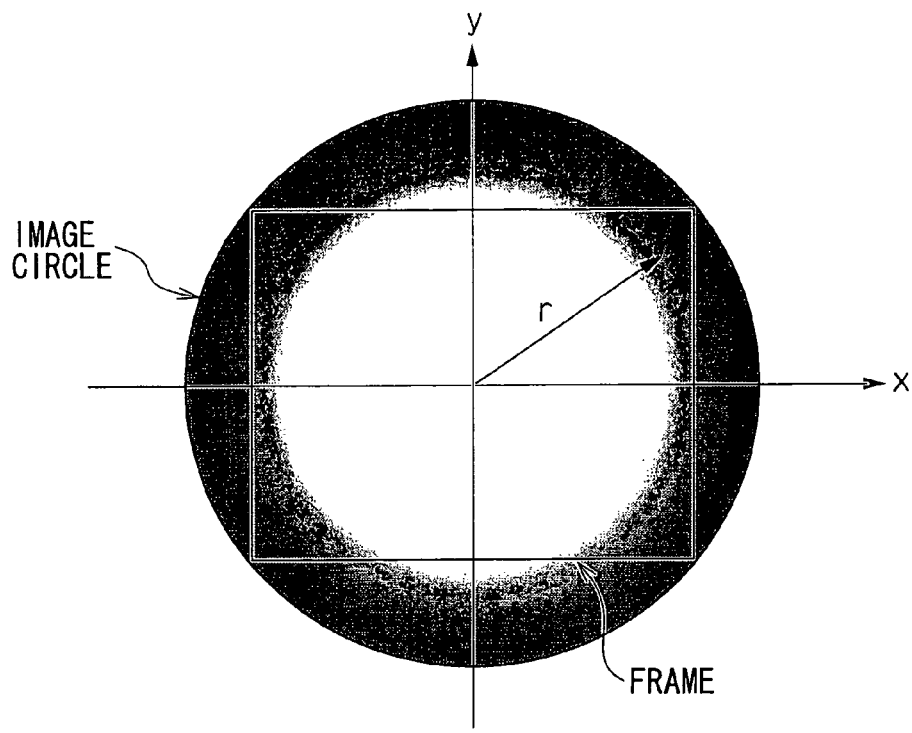
FIG. 4 is a drawing showing lens shading corrected by the present invention.

Namely, shading (peripheral extinction) such as shown in FIG. 4 exists at a lens for photographing, including that in the present embodiment. The light amount decreases along the directions from the center of the image (the optical axis) to the peripheral portion of the image, and, as a result, the four corners of the image become dark. This effect is particularly marked in wide-angle images photographed by a wide lens. Further, in CCDs which are often used in digital cameras, the sensitivity differs depending upon the angle of incidence of the light. Namely, CCDs which are often used in digital cameras have the property that, the further from the optical axis and the closer to the periphery of the image surface, the lower the sensitivity. This, in addition to the aforementioned peripheral extinction, further increases the non-uniformity in the light amount of the image.

Figure 5:
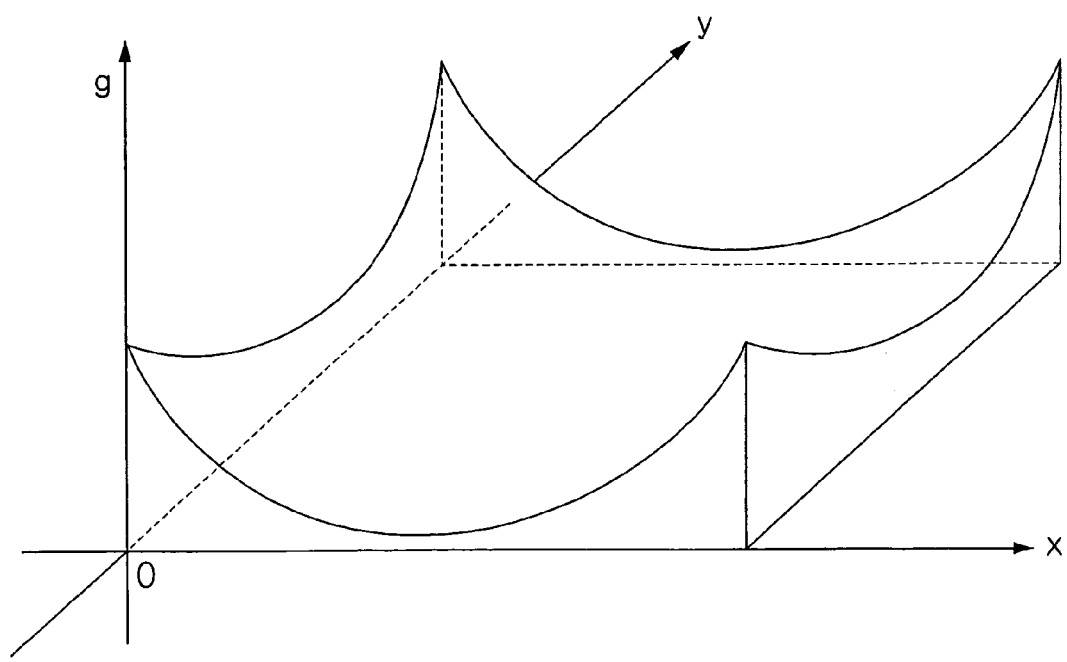
FIG. 5 is a drawing showing shading correction in accordance with the present invention.

Thus, the digital camera 10 is provided with the shading correcting circuit 12 which, as shown in FIG. 5, multiplies the image data transferred from the ADC 28 by the gain g which is proportional to a distance r from the center of the lens. In this way, the peripheral portion of the image, which is dark due to the shading, can be corrected so as to become brighter. Therefore, the image can be made to be an image having uniform brightness over the entire image.

However, when multiplying the image signals of the peripheral portion of the image by the gain g in the above method, even the noise is multiplied by the gain g. The noise is enhanced, and, as a result, there is the drawback that the noise of the peripheral portion of the image becomes conspicuous. To address this problem, conventionally, a noise filter, which has a uniform effect over the entire image, is used. However, because the strength of the noise differs at the central portion of the image and at the peripheral portion of the image, effective noise removal cannot be carried out.

Namely, the closer to the peripheral portion of the image, the greater the gain g, and the more conspicuous the noise becomes. However, on the other hand, at the central portion of the image, shading correction is not carried out, and therefore, the noise is not enhanced. When using a noise reduction filter having a uniform effect over the entire image, regardless of the fact that there is no noise at the central portion of the image, flat processing is carried out. Therefore, it is easy for fine image lines to be destroyed. Conversely, at the peripheral portion of the image, the gain value of the shading correction is large, and therefore, the effects of the noise reduction filter on the enhanced noise are insufficient.

Thus, in the noise reduction filter circuit 14 used in the present invention, the gain g used in the shading correction, i.e., a numerical value which varies proportionately to the distance from the center of the image surface, is used in the noise reduction filter processing. In this way, at the central portion of the image where there is no noise due to shading correction, the noise reduction filter processing also is not carried out, and therefore, there are no adverse effects on image quality. Conversely, at the peripheral portion of the image, because the gain value of the shading correction is large, the effects of the noise reduction filter on the enhanced noise are great, and therefore, noise removal can be carried out sufficiently.

An example of the noise reduction filter of the digital camera 10 relating to the embodiment of the present invention is shown in FIG. 6.

FIG. 6 shows, as an example, a two-dimensional filter of 3×3 pixels which is a so-called low-pass filter which carries out filtering with respect to density changes of high spatial frequencies (projecting by only one dot), but does not affect loose density changes of low spatial frequencies.

FIG. 6A shows a case in which there is no filter effect. The pixel of signal strength 1 is outputted as is without any changes in the eight surrounding pixels. (In the noise reduction filter circuit 14 used in the present embodiment, processing at the central portion of the image corresponds to this state.)

FIG. 6B shows a case in which the filter effect is at a maximum. The central pixel disappears as an image, and the density is completely flat in the range of the nine pixels.

FIG. 6C shows signal intensities of the 3×3 pixels and a coefficient a used in the noise reduction filter circuit 14 which is used in the present embodiment. Noise reduction processing is carried out by using the coefficient a which is inversely proportional to the gain g added to the image signal at the shading correcting circuit 12. In this way, at the central portion of the image where there is no noise due to shading correction, noise reduction filter processing also is not carried out, and therefore, the image quality is not adversely affected. Conversely, at the peripheral portion of the image, because the gain value of the shading correction is large, the effects of the noise reduction filter on the noise which has been enhanced also are great, and therefore, noise removal is carried out sufficiently.

Specifically, if the coefficient is a, by making the original one pixel (signal strength 1) $a/(a+8)$ and making each of the surrounding eight pixels $1/(a+8)$, from the $\infty$ coefficient a which is inversely proportional to the gain g added to the image signal at the shading correcting circuit 12, it is possible to obtain a noise reduction filter circuit in which the effect changes in accordance with the distance from the image center (i.e., in accordance with the shading correction gain g).

For example, at the central portion of the image, because the gain g is 0 and a is ∞, the surrounding eight pixels are 1/∞, i.e., 0, and the one pixel at the center is ∞/∞ which is 1 and the same value as in FIG. 6A. Namely, because there is no increase in noise due to shading correction, noise reduction processing by the filter is not carried out at all, and the contour lines and the like are not damaged.

As shown in FIG. 6D, the filter effect when a is 2 which is small, i.e., when the shading correction gain g is large near the image periphery, is such that the eight surrounding pixels are 1/10, and the one central pixel is 2/10, which is a value of 1/5 of that before processing. Because this is twice the signal strength of that of the surrounding eight pixels, the noise is buried in the eight surrounding pixels and is not conspicuous.

As shown in FIG. 6E, the filter effect when a is 7 which is large, i.e., when the shading correction gain g is small near the image center, is such that the eight surrounding pixels are 1/15, and the one central pixel is 7/15, which is a value of substantially half of that before processing. Because this is 7 times the signal strength of that of the surrounding eight pixels, it is possible to avoid a situation in which the contour lines are buried in the eight surrounding pixels and are not conspicuous.

The above-described noise correcting filter is one example. However, the present invention is not particularly limited thereto, and correction filters of other methods can be used instead, provided that they can effectively remove noise.

In digital cameras such as digital cameras using a zoom lens or a focal length switching lens, or single lens reflex type digital cameras whose lens can be replaced, or the like, the shading characteristic shown in FIG. 4 is not constant, and is determined in accordance with the lens which is used and the focal length thereof at that point in time. Therefore, there is the need to compute the gain value g corresponding to the respective conditions. A table for computing the gain value g may be recorded in advance in the ROM within the digital camera 10 for each lens and focal length thereof, and this table may be used in computing the gain value g.

Contour correction of the image is carried out at a contour correction processing circuit 16, independently of the above-described shading correction and noise removal. This is an operation in which, when the contour line of the subject in the image is detected, enhancement processing is carried out, and by enhancing the contrast, the contour line of the subject is made to be more conspicuous, and the sharpness when viewed is improved. At this time, the pixels forming the contour line are multiplied by a gain of a specific value, but because the contour enhancement processing is carried out uniformly over the entire image, the gain value used here is a uniform value for the entire image.

Figure 7:
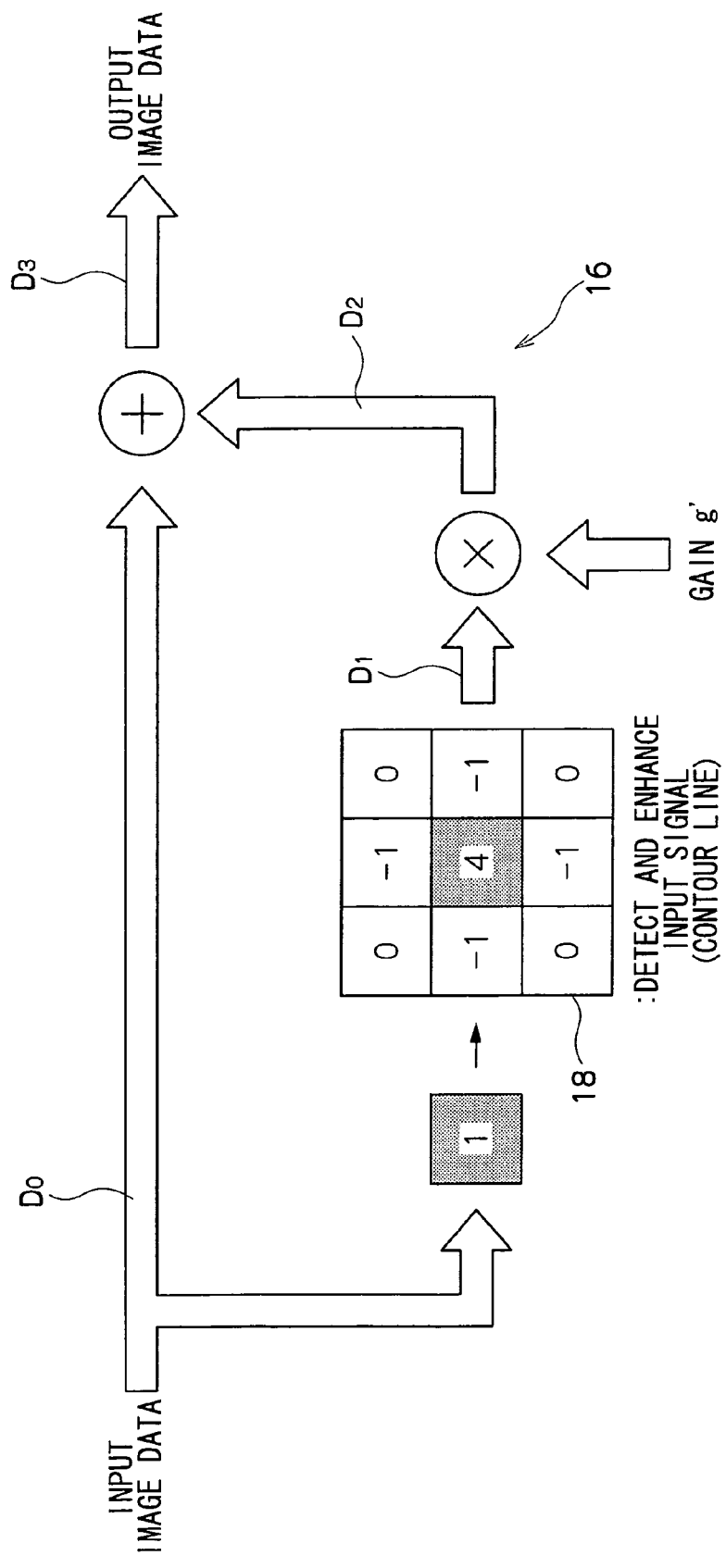
FIG. 7 is a drawing showing effects of a contour correction processing circuit in accordance with the present invention.

An example of the contour correction processing circuit of the digital camera 10 relating to the embodiment of the present invention is shown in FIG. 7.

As shown in FIG. 7, the contour correction processing circuit 16 has a filter 18. The contour line of the subject is detected from inputted image data D0 and enhanced, such that the sharpness when viewed is improved. Namely, by carrying out filter processing by the filter 18 on the one pixel having a signal strength of 1, the original one pixel is made to be 4 and the respective surrounding one pixels at the top, bottom, left and right are made to be −1, and if the contour line of the subject exists, the edges are enhanced such that a sharp image D1 is obtained.

The image signal D1, whose edges have been enhanced by the filter 18, is multiplied by gain value g' and becomes D2. In contrast to the above-described shading correction gain g, a uniform value for the entire image is used for this gain value g'. Therefore, the filter is a filter having uniform strength with respect to the entire image, and therefore, the noise which is visible also is uniform over the entire image surface. The point that a uniform processing can be carried out for the entire image even if noise reduction processing is carried out, is different than noise which is enhanced on account of the gain value of the shading correction. In the present invention, effective noise correction can be carried out by separating these two types of noise and using, in the correction of noise due to the shading correction, a filter corresponding to the noise distribution.

In addition to the above-described embodiment, the present invention can be applied to any type of device having a digital image photographing function, such as a digital video camera, a cell phone equipped with a digital camera, or the like.

What is claimed is:

1. An electronic imaging device comprising:
   a lens shading correcting circuit;
   a noise reduction filter;
   an optical unit including a lens which focuses an image of a subject; and
   an image pick-up section including an image pick-up element, which is disposed at a rear of an optical axis of a lens system and carries out image pick-up via the optical unit, and an analog/digital converter converting an analog image signal from the image pick-up element into a digital image signal,
   wherein the lens shading correcting circuit carries out shading correction by multiplying image data from the analog/digital converter by a gain which is proportional to a distance from a center of the lens, and
   the noise reduction filter carries out noise reduction processing by using a value which varies inversely proportionately to the gain and parameters used at the noise reduction filter are varied dynamically in accordance with an amount of correction at the lens shading correcting circuit.

2. The electronic imaging device of claim 1, further comprising a contour correction processing circuit,
   wherein the contour correction processing circuit carries out substantially uniform contour correction on the entire image independently of the shading correction and the noise reduction processing.

3. The electronic imaging device of claim 1, wherein the image pick-up element is a CCD.

4. An electronic imaging device comprising:
   an optical unit including a lens which focuses an image of a subject;
   an image pick-up section including an image pick-up element, which is disposed at a rear of an optical axis of a lens system and carries out image pick-up via the optical unit, and an analog/digital converter converting an analog image signal from the image pick-up element into a digital image signal;
   a lens shading correcting circuit;
   a noise reduction filter; and
   a contour correction processing circuit,
   wherein the lens shading correcting circuit carries out shading correction by multiplying image data from the analog/digital converter by a gain which is proportional to a distance from a center of the lens, the noise reduction filter carries out noise reduction processing by using a value which varies proportionately to the gain, and the contour correction processing circuit carries out substantially uniform contour correction at all regions of the image, independently of the shading correction and the noise reduction processing.

5. The electronic imaging device of claim 4, wherein the electronic imaging device is a digital camera.

6. The electronic imaging device of claim 4, wherein the electronic imaging device is a digital video camera.

7. The electronic imaging device of claim 4, wherein the noise reduction filter is a low-pass filter structured by a 3×3 two-dimensional filter.

8. The electronic imaging device of claim 4, wherein the contour correction processing circuit has a filter having substantially uniform strength with respect to the entire image.

* * * * *